United States Patent [19]

Smith

[11] Patent Number: 6,055,592
[45] Date of Patent: Apr. 25, 2000

[54] SMART CARD AUTHENTICATION SYSTEM COMPRISING MEANS FOR CONVERTING USER IDENTIFICATION AND DIGITAL SIGNATURE TO POINTING DEVICE POSITION DATA AND VICE VERSA USING LUT

[75] Inventor: Robert Neal Smith, Mesa, Ariz.

[73] Assignee: Motorola, Inc., Schaumburg, Ill.

[21] Appl. No.: 09/021,015

[22] Filed: Feb. 9, 1998

[51] Int. Cl.[7] .............................. S09G 3/02; G06K 5/00; H04L 9/32

[52] U.S. Cl. ................... 710/73; 235/380; 235/462.43; 713/159; 380/52; 380/25; 345/163; 710/36

[58] Field of Search ............................. 395/500; 380/21, 380/46, 52, 25; 235/472, 380; 345/163, 179; 713/159; 705/26, 65; 710/73, 72, 36

[56] References Cited

U.S. PATENT DOCUMENTS

| | | | |
|---|---|---|---|
| 4,140,272 | 2/1979 | Atalla | 235/380 |
| 5,148,481 | 9/1992 | Abraham et al. | 380/46 |
| 5,311,396 | 5/1994 | Steffen | 361/736 |
| 5,322,989 | 6/1994 | Long et al. | 235/375 |
| 5,327,018 | 7/1994 | Karlish et al. | 307/244 |
| 5,369,262 | 11/1994 | Dvorkis et al. | 345/179 |
| 5,448,050 | 9/1995 | Kostizak | 235/462.43 |
| 5,448,804 | 9/1995 | Clark | 235/382 |
| 5,546,463 | 8/1996 | Caputo et al. | 713/159 |
| 5,550,561 | 8/1996 | Ziarno | 345/163 |
| 5,610,981 | 3/1997 | Mooney et al. | 713/185 |
| 5,633,489 | 5/1997 | Dvorkis et al. | 235/462.43 |
| 5,724,522 | 3/1998 | Kagami et al. | 705/26 |
| 5,778,071 | 7/1998 | Caputo et al. | 713/159 |
| 5,850,442 | 12/1998 | Muftic | 705/65 |
| 5,878,142 | 3/1999 | Caputo et al. | 713/159 |
| 5,940,604 | 8/1999 | Merryman et al. | 395/500.03 |

Primary Examiner—Thomas C. Lee
Assistant Examiner—Katharina Schuster
Attorney, Agent, or Firm—Gregory J. Gorrie

[57] ABSTRACT

A mouse system (100) for authenticating a user and providing access to a computer (212) includes a pointing device and card reader (106) which share a computer interface port (222) of the computer (212). User information is read off the card (104), converted to pointing device codes, and provided to the computer (212). The computer reconverts the pointing device codes to user information to deny or grant access. The card reader (106) is capable of reading commercially available smart cards, credit cards, and other media having user information electronically stored on the card (104).

21 Claims, 2 Drawing Sheets

PREDETERMINED ENCODED CARD CODE LOOKUP TABLE
| CARD CODE | X | Y |
|---|---|---|
| 0 | 0111 1111 | 0000 0000 |
| 1 | 1001 0000 | 1111 1110 |
| 2 | 1111 1011 | 0010 0000 |
| 3 | 0111 0000 | 0111 0110 |
| 4 | 0110 1111 | 1011 1110 |
| 5 | 1100 1100 | 1110 0110 |
| 6 | 1101 1011 | 0101 1000 |
| 7 | 0110 0011 | 0100 1111 |
| 8 | 0100 0010 | 1110 1101 |
| 9 | 1111 0100 | 1011 0011 |
| | BITS 7-0 | BITS 15-8 |
*FIG. 3*
| COMMAND TYPE | COMMAND CODE |
|---|---|
| FIRST CARD CODE | 0000 0000 |
| LAST CARD CODE | 0101 0101 |
| CARD CODE | 1111 1111 |
| | BITS 23-16 |
*FIG. 4*
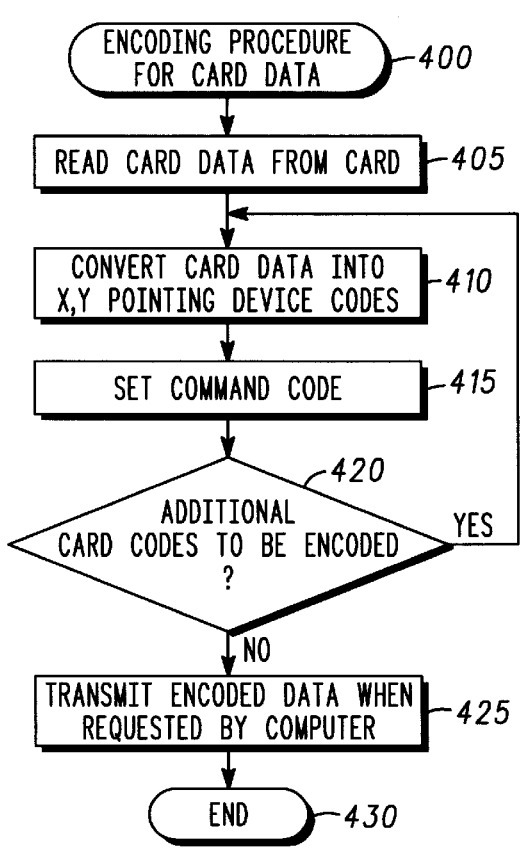
*FIG. 5*
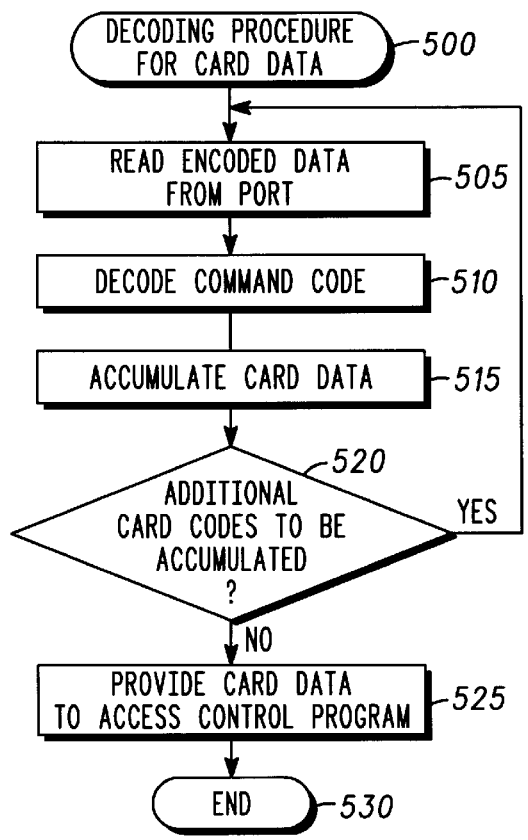
*FIG. 6*

SMART CARD AUTHENTICATION SYSTEM COMPRISING MEANS FOR CONVERTING USER IDENTIFICATION AND DIGITAL SIGNATURE TO POINTING DEVICE POSITION DATA AND VICE VERSA USING LUT

FIELD OF THE INVENTION

This invention relates in general to the field of pointing devices for computers and in particular to pointing devices for computers having an integrated card reader for granting access to computers.

BACKGROUND OF THE INVENTION

The electronic commerce industry has a need to provide authentication of users before providing access to the processing capabilities of a computer or before performing electronic interactions while logged onto the computer. Prior to allowing access to computer resources, the computer needs to determine when a user which is attempting to gain access is an authorized user. Additionally, when transacting business over the Internet, authenticating the identity of a user is critically important when money and valuable data are transferred. Regardless of the activity, it is important to allow only authorized users to perform operations on a computer.

Prior to the availability of electronic tokens, typical systems used simple passwords to authenticate a user and to allow access to a computer. The password method of providing access control has been found to be inadequate when protecting business data having valuable data stored on the computer. Passwords of four to six characters in length can easily be discovered and improperly used. When passwords are sent over telephone lines, they may be intercepted and used for unauthorized purposes. Many businesses are currently using a one-time pass code which changes every few seconds to determine access to computer systems. For even greater security, a smart card has been proposed which contains certified account numbers which are difficult to counterfeit.

A smart card is a plastic card that holds electronic tokens (e.g., digital signatures, user identification and information, encryption and decryption keys, security tokens, biometrics information, etc.) which are read into a computer via a card reader. Smart cards typically contain large coded messages which are difficult to counterfeit. Currently, the electronic commerce industry is attempting to provide simple methods of promoting electronic commerce using smart cards. One problem with using smart cards is the difficulty in retrieving the electronic tokens from the cards without dedicating limited computer resources (e.g., input/output ports) to retrieving the electronic tokens.

Additionally, information describing users may be stored as electronic tokens on cards. An electronic token may be used in a procedure for granting access to a user of a computer system via an access control program. A computer system would grant access to the user when the user is identified as an authorized user of the system. A computer system would deny access to the user when the user fails to be identified as an authorized user of the system.

Thus, what is needed is a system and method providing an efficient way of receiving electronic tokens in computers systems for use in electronic commerce. Also, what is needed is a system and method of providing access control to a computer. What is also needed is a simple, cost effective system and method of using an existing interface port of a computer to receive electronic tokens in a computer.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

FIG. 3 illustrates a sample card code to pointing device code mapping lookup table in accordance with a preferred embodiment of the present invention;

FIG. 4 illustrates a command type to command code mapping table in accordance with a preferred embodiment of the present invention;

FIG. 5 is a simplified flow chart of an encoding procedure for card data in accordance with a preferred embodiment of the present invention;

FIG. 6 is a simplified flow chart of a decoding procedure for card data in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a system and method for access control to a computer via an existing interface port on the computer. In the preferred embodiment of the present invention, a pointing device (e.g., mouse, trackball, pen, glidepad, etc.) is integrated with a card reader and interfaced to a computer system via the interface port on the computer for the pointing device. The pointing device provides typical pointing device inputs to the computer in the form of position data (e.g., x,y Cartesian coordinates, polar coordinates, etc.) and command codes (e.g., button up, button down, etc.). Position data together with a command code is herein referred to as a pointing device code.

Additionally, card data (e.g., alphanumeric and symbol data stored on a card, such as a digital signature stored on a smart card), may also be represented as a pointing device code. In the preferred embodiment, card data is represented by one or more card codes. In the preferred embodiment, each card code is a number which may be encoded as position data and a command code and therefore as a pointing device code. Thus, when a card code is encoded into the format of a pointing device code, the card code is herein referred to as a pointing device code.

Figure 1:
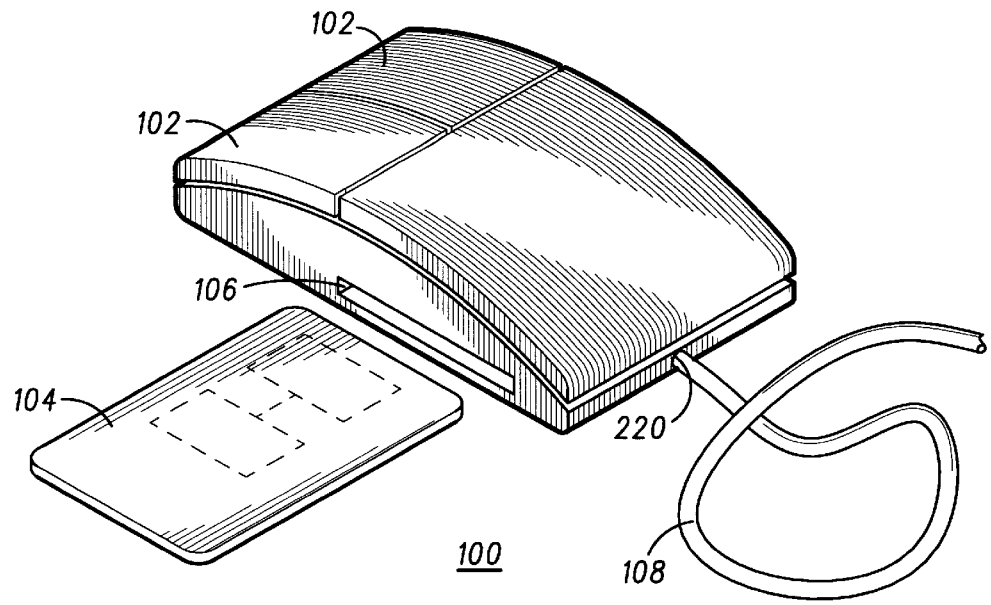
FIG. 1 is a perspective view of a pointing device with an integrated card reader for a computer system in accordance with a preferred embodiment of the present invention.

FIG. 1 is a perspective view of a pointing device with an integrated card reader for a computer system in accordance with a preferred embodiment of the present invention. The pointing device with the integrated card reader is herein referred to as a "mouse". When only the pointing device is being referenced, the pointing device is herein referred to as "pointing device". When only the card reader is being referenced, the card reader is herein referred to as "card reader". Mouse system 100 is principally comprised of buttons 102, card reader 106, mouse interface port 220. Additionally, mouse system 100 receives, among other things, card data from card 104.

In the preferred embodiment, card data from card 104 is read by card reader 106. Card data from card 104 includes electronic tokens which supply information to a computer connected to mouse system 100 via interface cable 108. Preferably, mouse system 100 receives card data from card 104 but does not include card 104.

Additionally, mouse system 100 supplies position data for the pointing device to the computer via interface cable 108. Data representing the button position of buttons 102 is also encoded by mouse system 100 and is supplied to the computer via interface cable 108.

In the preferred embodiment, interface cable 108 connects to mouse interface port 220. Mouse interface port 220 is preferably the electrical and mechanical connection point of interface cable 108 and mouse system 100.

Figure 2:
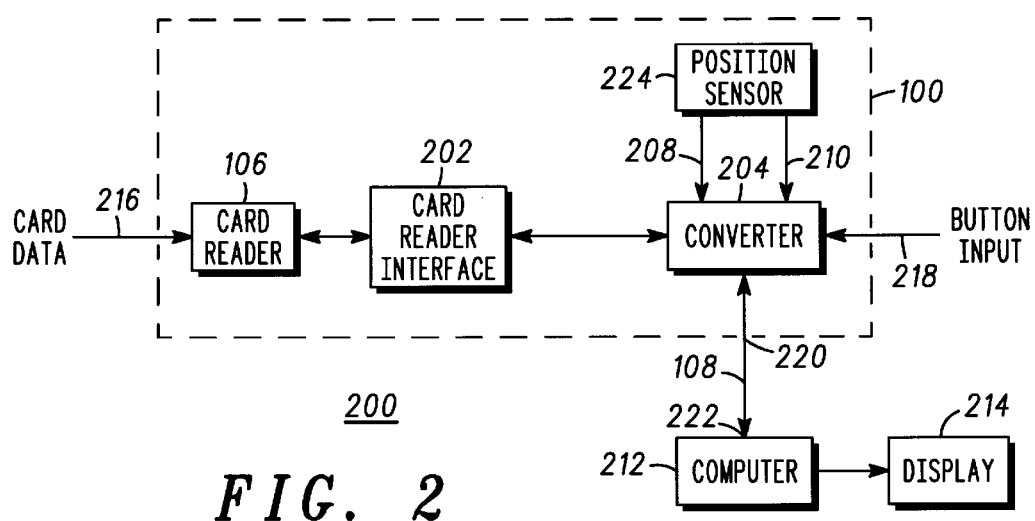
FIG. 2 illustrates a simplified hardware block diagram of a pointing device with an integrated card reader for a computer system in accordance with a preferred embodiment of the present invention.

FIG. 2 illustrates a simplified hardware block diagram of a pointing device with an integrated card reader for a computer system in accordance with a preferred embodiment of the present invention. In the preferred embodiment of the present invention, computer system 200 includes mouse system 100, computer 212, computer interface port 222, and display 214. In addition to the description of mouse system 100 discussed above (FIG. 1), mouse system 100 includes card reader interface 202, position sensor 224, and converter 204.

In the preferred embodiment, computer system 200 provides requests to mouse system 100 requesting pointing device codes representing the pointing device position data and pointing device codes representing the card codes which are encoded as pointing device codes by converter 204. Preferably requests to mouse system 100 are provided by a software program which is performed by computer 212. The requests created in computer 212 are transmitted from computer interface port 222 to mouse interface port 220 in mouse system 100 via interface cable 108.

Converter 204 receives requests for pointing device codes from computer 212 and determines when to return pointing device codes which are from a combination of position sensor 224 and button input 218 and when to return pointing device codes which are from card data 216 read by card reader 106. In the preferred embodiment, when pointing device codes are from position sensor 224 and button input 218, x-tics 208 and y-tics 210 are output from position sensor 224 into converter 204. Preferably, x-tics 208 and y-tics 210 represent the x and y directions, respectively, mouse system 100 has moved with respect to a predetermined Cartesian coordinate system. The predetermined Cartesian coordinate system represents a coordinate system which is managed by computer 212 and receives coordinate system inputs (e.g., x and y-tics) from mouse system 100. Computer 212 determines when display 214 will show a pointing device icon (e.g., arrowhead) and when to process card data 216 being received from mouse system 100.

X-tics 208 represents the number of tics in the x direction a first encoding wheel (not shown) has moved in mouse system 100. Y-tics 210 represents the number of tics in the y direction a second encoding wheel (not shown) has moved in mouse system 100. As discussed above, when mouse system 100 is moved, the number of x-tics and y-tics are translated into cursor movement on display 214 by a software program performed by computer 212.

Converter 204 is also coupled to card reader interface 202. In the preferred embodiment, when converter 204 requests card data 216 from card reader interface 202, card reader interface 202 then requests card data 216 from card reader 106. Preferably, card data 216 is provided to converter 204 and then converter 204 performs a table lookup for pointing devices codes (e.g., x-tics, y-tics, and command code) from a memory (not shown) for each byte of card data 216. Card data 216 represents, among other things, electronic tokens as described above. Electronic tokens may represent biometrics data for a user which is on the order of tens, hundreds, thousands, or more bits of electronic data. In the preferred embodiment, when converter 204 encodes card data 216 into pointing device codes, the pointing device codes are requested from mouse system 100 using a technique (e.g., polling, interrupt driven, etc.) which is determined by a software program running in computer 212.

FIG. 3 illustrates a sample card code to pointing device code mapping lookup table in accordance with a preferred embodiment of the present invention. In the preferred embodiment, card data 216 (FIG. 2) is represented as one or more card codes (e.g., numbers). Preferably, each card code may be encoded as x-tics and y-tics and some command code (FIG. 4). Examples of each card code 305 are shown in card code lookup table 300 (FIG. 3). As shown in FIG. 3, a card code of "0", is preferably encoded as a pointing device code having x element 310 with a bit pattern of "0111 1111" and y element 315 with a bit pattern of "0000 0000". In other embodiments, other bit patterns may represent card codes. Additionally, in other embodiments, card codes may be any combination of numbers, letters, characters, symbols. In the preferred embodiment, each card code is encoded as a 24-bit number. Preferably, bits 0–7 represent the x-tics, bits 8–15 represent the y-tics and bits 16–23 represent the command code (FIG. 4).

FIG. 4 illustrates a command type to command code mapping table in accordance with a preferred embodiment of the present invention. In the preferred embodiment, a pointing device code is comprised of a x-tics (8 bit), y-tics (8-bit), and a command code (8-bit) element. Therefore, in the preferred embodiment, each pointing device code is a 24-bit number. Preferably, when card codes are encoded into pointing device codes, a converter determines which card codes have been transmitted to the requesting device (e.g., computer) and appends a command code to each card code. FIG. 4 shows the preferred command codes which may be appended to encoded card codes. Command type 320 lists the different types of card codes and command code 325 shows the bit pattern associated with each command type. In other embodiments, other command types and other command code bit patterns are possible.

FIG. 5 is a simplified flow chart of an encoding procedure for card data in accordance with a preferred embodiment of the present invention. In the preferred embodiment, procedure 400 (FIG. 5) is performed by a mouse system to encode card codes as pointing device codes. Preferably, the pointing device codes are requested by a computer from the mouse system during a procedure (e.g., software program) performed by the computer.

In task 405, card data is read from the card. In the preferred embodiment, the computer requests card data from a converter in the mouse system. The converter requests card data from a card reader interface and the card reader interface requests card data from a card in the card reader. Preferably, the card data is read from the card by the card reader and supplied to the converter via the card reader interface.

In another embodiment of the present invention, the card data is encrypted. Preferably, card codes representing the encrypted card data are encoded similar to the encoding procedure for card data which is not encrypted.

In task 410, card data is converted into pointing device codes. In the preferred embodiment, each card code of the card data is converted by the converter to x-tics and y-tics based on a lookup table such as card code lookup table 300 (FIG. 3).

In task 415, the command code is set. In the preferred embodiment, each card code of the card data has a command code which is set based on the type of card code. For example, when the card code being encoded is the first card code of card data, the command code is represented by a command type having the bit pattern "0000 0000". A suitable command type to command code mapping for the preferred embodiment of the present invention is described above (FIG. 4).

In task 420, a check is performed to determine when additional card codes are to be encoded. In the preferred embodiment, when additional card codes need to be encoded, tasks 410–415 are performed. Otherwise, task 425 is performed.

In task 425, encoded data is transmitted from the mouse system when requested by the computer. In the preferred embodiment, the computer requests pointing device codes (e.g., encoded card data and position related x-tics, y-tics, and command codes) based on a software program performed by the computer. When the mouse system receives the request from the computer, the converter in the mouse system determines when to transmit encoded card data and when to transmit position related information.

FIG. 6 is a simplified flow chart of a decoding procedure for card data in accordance with a preferred embodiment of the present invention. In the preferred embodiment, procedure 500 (FIG. 6) is performed by a computer system which decodes card codes from pointing device codes. Preferably, the pointing device codes are requested by the computer from a mouse system during a procedure (e.g., software program) performed by the computer. In the preferred embodiment, the computer receives pointing devices codes which represent electronic tokens read by a mouse system and pointing device codes representing position data from the pointing device in a mouse system.

In task 505, encoded data is read from the port. In the preferred embodiment, encoded data is read from the computer interface port by the computer. Preferably, the encoded data represents pointing devices codes. When each pointing device code represents an encoded card code, card data may be determined from reconstructing the series of pointing devices codes representing the series of card codes.

In task 510, the command code is decoded. In the preferred embodiment, the command code for each pointing device code is decoded. Preferably, the command code is decoded by a software program performed by the computer. When the software program determines the type of command (e.g., first card code, last card code, etc.), the software program begins accumulating the card codes to reconstruct the card data transmitted by the mouse system.

Additionally, pointing device codes for position related data for the pointing device are received during task 510. In the preferred embodiment, when position related data is received in task 510 the software program performed by the computer determines the movement for the pointing device icon on the display.

In task 515, card data is accumulated. In the preferred embodiment, the card codes associated with the decoded command codes decoded in task 510 are accumulated by the software program being performed by the computer. Preferably, card codes are reconstructed in task 515. In the preferred embodiment of the present invention, card codes are reconstructed using a lookup table stored in the computer. Preferably the lookup table stored in the computer is similar to card code lookup table 300 (FIG. 3).

In task 520, a check is performed to determine when additional card codes are to be accumulated. In the preferred embodiment, the software program performed by the computer determines when the final card code is read form the computer interface port. When additional card codes are to be accumulated, task 505 is performed. When no additional card codes are to be accumulated, task 525 is performed.

In task 525, card data is provided to the access control program. In the preferred embodiment, the software program performed by the computer provides the card data to an access control program also performed by the computer. Preferably, when the card data read from the card in the mouse system matches the card data stored in the computer, the access control program grants access to the computer. In the preferred embodiment, when access is granted to a user, the card data is an electronic token for the user needing access to the computer.

In another embodiment, the card data stored on the card and read by the mouse system is in encrypted format. Preferably, in this other embodiment, the access control program performed by the computer performs a decryption operation on the card data read from the card prior to comparing with corresponding card data stored on the computer.

Figure 7:
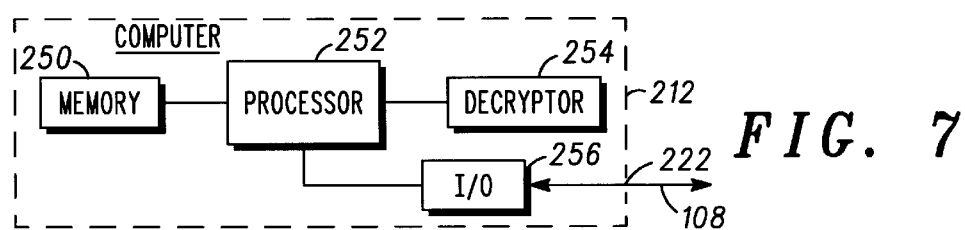
FIG. 7 illustrates a simplified hardware block diagram of a computer in accordance with a preferred embodiment of the present invention.

FIG. 7 illustrates a simplified hardware block diagram of a computer in accordance with a preferred embodiment of the present invention. In the preferred embodiment, computer 212 (FIG. 7) includes memory 250, processor 252, decryptor 254, input and output interface 256, and computer interface port 222.

Computer 212 performs operations as described above for FIG. 2. Memory 250 is used by computer 212 to, among other things, store software programs for interfacing computer 212 with a pointing device and information for users of computer 212. Additionally, memory 250 may store a decryption key for decrypting information which is read into computer 212 from an external source.

In the preferred embodiment, processor 252 performs, among other things, a software program (e.g., mouse system driver) for sending and receiving data from a mouse system (e.g., pointing device with an integrated card reader). Data which is sent from computer 212 includes commands which request pointing device codes from the pointing device via interface cable 108. Also, data which is received by computer 212 includes pointing device codes. Pointing device codes are preferably sent from a pointing device to computer 212 via interface cable 108. Pointing device codes include user information which are preferably encoded by a converter in a mouse system.

In the preferred embodiment, decryptor 254 performs decryption operations for computer 212. When pointing device codes received by input and output interface 256 and processed by processor 252 need decrypting, processor 252 forwards the pointing device codes to decryptor 254 for decrypting. Preferably, when decryptor 254 completes the decrypting procedure, the pointing device codes which have been decrypted are returned to processor 252 for additional processing. For example, a decryption key may be stored in memory 250 and used by decryptor 254 to decrypt user information which is received from a mouse system. Preferably, the data received from a mouse system is formatted as pointing device codes.

Input and output (I/O) interface 256 provides, among other things, a buffer for data sent and received by computer 212. I/O interface 256 is preferably implemented as a serial data communication interface however, other types of communications interfaces may be used (e.g., parallel data communication interface, etc.).

The exemplification set out herein illustrates a preferred embodiment of the invention in one form thereof, and such exemplification is not intended to be construed as limiting in any manner.

Thus, a pointing device with integrated card reader for a computer system has been described which overcomes specific problems and accomplishes certain advantages relative to prior art methods and mechanisms. The improvements over known technology are significant. The expense of extra hardware required for interfacing a pointing device and card reader to a computer system are avoided. Similarly, what has been shown is a system and method providing access control to a computer using an existing interface port of the computer. Also shown is a system and method of receiving pointing device codes which represent electronic tokens and position data for a mouse system.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A pointing device for authenticating a user of a computer and providing first position data to the computer, the first position data representing the pointing device's relative position, the pointing device comprising:

a smartcard reader for reading a user identification (ID) and digital signature from a smart card;

a memory for storing a first look-up-table (LUT);

a converter for converting the user identification (ID) and the digital signature to second position data using the first LUT; and a computer interface port for providing, in response to a request by the computer, the first and second position data to the computer, wherein the first position data is provided with first command codes indicating that the first position data represents the pointing device's relative position, and the second position data is provided with second command codes indicating that the second position data represents the user ID and the digital signature, wherein in response to receipt of the second command codes, the computer converts the second position data back to the user ID and the digital signature using a second LUT stored in the computer, the second LUT corresponding with the first LUT, verifies the digital signature, and grants the user access to the computer when the user ID matches a corresponding user ID stored in the computer and the digital signature is verified, and wherein in response to receipt of any of the first command codes, the computer translates the first position data into cursor movements on a display.

2. A pointing device as claimed in claim 1 wherein the user ID is stored on the smart card in encrypted form, and the computer has decryption means for performing a decryption operation on the user ID prior to comparing the user ID with the corresponding user ID stored in the computer.

3. A pointing device as claimed in claim 1 further comprising a card reader interface for transferring the user ID and the digital signature to the converter.

4. A pointing device as claimed in claim 1 further comprising means for encrypting the user ID and the converter converts the encrypted user ID to the second position data, and wherein the computer converts the second position data back to the encrypted user ID and decrypts the encrypted user ID.

5. A pointing device as claimed in claim 1 wherein the converter further comprises a processor for determining the second position data using a program stored within the pointing device, the program being performed on the user ID and the digital signature.

6. A pointing device as claimed in claim 1 further comprising a position sensor that generates positional information in response to movement of the pointing device, and wherein the converter converts the positional information to the first position data using the first LUT.

7. A pointing device as claimed in claim 1 wherein the converter further comprises:

means for receiving the request for the first and second position data from the computer; and the converter has means for sending the first and second position data and first and second command codes to the computer interface port in response to the request.

8. A pointing device as claimed in claim 1 further comprising at least one button, and wherein the converter includes:

a button position sensor for sensing a position of the at least one button and generating button position data; and means to convert the button position data to third position data using said first LUT.

9. A computer system that grants access to an authenticated user comprising:

a computer; and a pointing device with a smartcard reader for reading secure user information from a smartcard, the pointing device providing first position data to the computer that represents the relative position of the pointing device, the pointing device comprising:

a memory for storing a first look-up table (LUT);

a first converter for converting the secure user information to second position data using the first LUT; and a computer interface port for providing, in response to a request from the computer, the first and second position data to the computer, the first position data being provided with first command codes indicating that the first position data represents the pointing device's relative position, the second position data being provided with second command codes indicating that the second position data represents the secure user information, and wherein the computer comprises:

a memory for storing a second LUT that corresponds with the first LUT;

a second converter for converting, in response to receipt of the second command codes, the second position data back to the secure user information using the second LUT; and a processor for verifying the secure user information and comparing a user ID portion of the secure user information with a corresponding user ID stored in the computer, and the processor granting the authenticated user access to the computer when secure user information is verified and the user ID matches the corresponding user ID stored in the computer, and in response to receipt of any of the first command codes, the processor translating the first position data into cursor movements for a display.

10. A computer system as claimed in claim 9 wherein the second converter, in response to the receipt of the first command codes, converts the first position data to cursor movements on the display.

11. A computer system as claimed in claim 9 wherein the user ID portion is stored on the smartcard in encrypted form and the secure user information includes a digital signature, and the computer further comprises a decryptor for performing a decryption operation on the user ID prior to comparing the user with the corresponding user information in the computer, and performing a verification operation on the digital signature.

12. A computer system as claimed in claim 9 further comprising a card reader interface for transferring the secure user information to the first converter.

13. A computer system as claimed in claim 9 wherein the pointing device further comprises means for encrypting the user ID portion and the first converter converts the encrypted user ID portion to a portion of the second position data, and wherein the second converter converts the second position data back to the encrypted user ID, and wherein the computer further comprises a decryptor for decrypting the encrypted user ID.

14. A computer system as claimed in claim 9 wherein the first converter further comprises a processor determining the second position data using a program stored in the pointing device, the program being performed on the secure user information.

15. A computer system as claimed in claim 9 wherein the pointing device further comprises a position sensor that generates positional information in response to movement of the pointing device, and wherein the first converter converts the positional information to the first position data using the first LUT.

16. A computer system as claimed in claim 9 wherein the first converter further comprises:

means for receiving a request from the computer for the first and second position data; and means for sending the first and second position data and the first and second command codes to the computer interface port in response to the request.

17. A computer system as claimed in claim 9 wherein the pointing device further comprises at least one button, and wherein the converter includes:

a button position sensor for sensing a position of the at least one button and generating button position data; and means to convert the button position data to third position data using said first LUT.

18. A method of authenticating a user of a computer through a smartcard in a pointing device that provides first position data to the computer, the first position data representing the pointing device's relative position, the method comprising the steps of:

reading a user identification (ID) and digital signature from the smartcard;

converting, in the pointing device, the user identification (ID) and digital signature to second position data using a first look-up-table (LUT) stored in a memory of the pointing device;

when requested by the computer, providing the first and second position data to the computer from the pointing device, the first position data being provided with first command codes indicating that the first position data represents the pointing device's relative position, the second position data being provided with second command codes indicating that the second position data represents the user ID and the digital signature;

in response to receipt of the second command codes, the computer performing the steps of:

converting the second position data to the user ID and the digital signature using a second LUT stored in the computer, the second LUT corresponding with the first LUT;

verifying the digital signature using a key stored in the computer;

comparing the user ID with a corresponding user ID stored in the computer; and granting the user access to the computer when the digital signature is verified and the user ID matches the corresponding user ID stored in the computer, and in response to receipt of any of the first command codes, the computer performing the step of translating the first position data into cursor movements on a display.

19. A method as claimed in claim 18 wherein the user ID is stored on the smartcard in encrypted form, and the method further comprising the step of decrypting the user ID, in the computer prior to the comparing step.

20. A method as claimed in claim 18 further comprising the step of refusing access to the computer when in the comparing step, either the user ID fails to match the corresponding user ID stored in the computer, or the digital signature does not verify.

21. A method as claimed in claim 18 further comprising the steps of encrypting the user ID in the pointing device, prior to the converting in the pointing device step; and decrypting the user ID in the computer, prior to the comparing step.

* * * * *